United States Patent [19]

Hause

[11] 3,863,450
[45] Feb. 4, 1975

[54] HYDROSTATIC TRANSMISSION
[75] Inventor: Gilbert K. Hause, Bloomfield Hills, Mich.
[73] Assignee: General Motors Corporation, Detroit, Mich.
[22] Filed: Nov. 8, 1973
[21] Appl. No.: 413,880

Related U.S. Application Data
[62] Division of Ser. No. 250,368, May 4, 1972, Pat. No. 3,805,641.

[52] U.S. Cl.................. 60/487, 60/490, 60/DIG. 10
[51] Int. Cl............................................. F16h 39/46
[58] Field of Search ....... 60/487, 488, 490, DIG. 10

[56] References Cited
UNITED STATES PATENTS

| | | | |
|---|---|---|---|
| 3,279,172 | 10/1966 | Kudo et al. | 60/DIG. 10 |
| 3,372,545 | 3/1968 | Hyde | 60/487 |
| 3,486,335 | 12/1969 | Kern et al. | 60/488 |

Primary Examiner—Edgar W. Geoghegan
Attorney, Agent, or Firm—A. M. Heiter

[57] ABSTRACT

A unitary power package having an engine, a pump and motor hydrostatic transmission and a differential. The engine housing has an annular transmission mounting pad about the engine drive shaft and a differential housing portion. The hydrostatic transmission housing has an intermediate wall portion having on one side a cylindrical pump portion and the motor power passage portion on a motor axis and on the other side a pump power passage portion on the pump axis and a motor cylindrical portion on the motor axis. The pump and motor cylindrical portions partially overlap. The connecting power passage portions from the pump power passages follow the motor cylindrical portion, cross the intermediate wall at the nape between the cylindrical portions and then follow the pump cylindrical portions to the motor power passages. The motor shaft extends through the motor pintle to drive the differential in the differential housing portion of the engine housing.

3 Claims, 3 Drawing Figures

HYDROSTATIC TRANSMISSION

This is a Division of Ser. No. 250,368, filed May 4, 1972 now Patent No. 3,805,641 granted April 23, 1974. This invention relates to hydrostatic transmissions and particularly a unitary power package hydrostatic transmission drive.

This invention provides a rigid, lightweight, and compact pump motor hydrostatic transmission having a housing consisting of three basic members, a main housing wall providing both the pump and motor support and chamber enclosing portions and a pump coverplate and a motor coverplate covering the respective chambers. In the main housing part of the cylindrical pump and motor housing portions are located in partially overlapping relation on opposite sides of the intermediate wall. The power passages connecting the pump and motor are formed as a portion of the main housing wall port. These power passages have a pump passage portion at the pump ports on the side of the intermediate wall opposite the pump chamber and a motor passage portion at the motor ports on the side of the intermediate wall opposite the motor. These pump and motor passage portions are thus respectively adjacent and have common portions respectively with the cylindrical motor and pump housing portions. The power passages also have connecting portions which extend from the pump passage portions along the perimeter of the motor cylindrical housing portion to the nape between the cylindrical housing portions, where they cross over the intermediate wall and extend along the perimeter of the pump cylindrical housing portion to the motor passage portion.

In this integral cast arrangement, the intermediate wall, cylindrical housing portions and passage portions are strengthened by each other. The cylindrical housing portions and the passage portions, which provide the housing and passage structure, act as strengthening ribs. The cylindrical pump and motor housing portions are partially overlapped so they are adjacent the motor and pump ports respectively and have common wall portions with the motor and pump passage portions to minimize the offset distance between the pump and motor axes, reduce the length of the power passages and provide a compact hydrostatic transmission assembly.

In the power package assembly, the cylindrical pump housing portion is secured to the annular mounting pad on the engine housing located around the engine drive shaft and follows the pump cylindrical wall and motor passage portion. The engine drive shaft is connected to the pump shaft. The motor output shaft extends from the motor housing portion in the same direction as the pump shaft and to a differential drive gear located in a differential housing portion of the engine housing. The differential drive gear is connected by a chain to the differential ring gear to drive the differential. The swing axle differential has a carrier with an internal cylindrical bearing, having cylindrical bevel gear with through opposite axial slots receiving the universal ball drive members rotatably mounted on a pin fixed in the inboard end of each swing axle.

These and other features of the invention will be more apparent from the following description and drawings.

Figure 3:
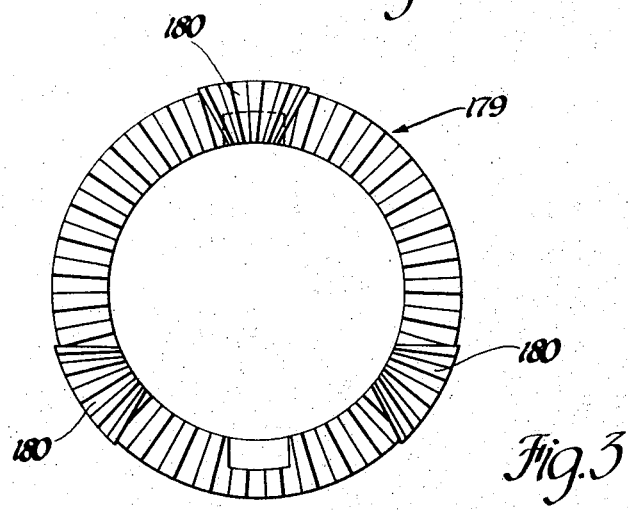

FIG. 3 schematically shows a modified differential arrangement.

Referring to the drawing, the power package or assembly consists of an engine 10, a hydrostatic transmission assembly 11 and a final differential drive assembly 12. While any conventional engine may be used, a V-8 engine is shown having an engine block 14, a head 15, a lower housing or oil pan 16 and a valve cover 17 conventionally secured together to provide an engine housing 18. The V-8 type internal combustion engine 10 has conventional power generating means, illustrated in part by the crankshaft 19 and cylinders 20 shown in dotted lines. The output shaft 21, a portion of the crankshaft 19, is rotatably supported in bearings 22 and sealed by seal 23 in the end wall 24 of the engine housing 18 and the axis 25. The end wall 24 has a suitable securing flange and pad 30 to support the hydrostatic transmission 11, as explained in more detail below. A flywheel 26 is secured by screws 27 to the flange 28 on shaft 21. A conventional spring damper 29 is suitably secured by screws 31 to the flywheel and has located in a bore in shaft 21, an internal splined hub 32 driving the hydrostatic transmission input shaft or pump drive shaft 33.

The hydrostatic transmission assembly 11 has a main housing portion 36 common to both of the pump and motor units and a circular pump cover plate portion 37 and a motor cover plate portion 38 respectively secured thereto by a suitable annular series of screws 39 and 41 respectively. The main housing portion 36 has a central or intermediate wall portion 42 which has integrally formed therewith, on the inboard side, a cylindrical pump housing portion 43 and a central pintle support portion 44 both located concentrically about the engine and the pump axis 25 and a central axial motor passage portion 46 concentric with the motor axis 47 which is parallel to, but offset from, the pump axis 25. On the other, or outboard, side of the intermediate wall 42, there is also integrally formed the cylindrical motor portion 48 and the central motor pintle support portion 49, both concentric to the motor axis 47 and the central pump axial passage portion 51.

The pumps and motors are of a conventional piston and cylinder type, for example, the radial piston pump shown in the E. E. Simmons U.S. Pat. No. 3,274,946 issued Sept. 27, 1966. The pump has a cylindrical pintle 52 having a flange secured by suitable screws 53 to the pump pintle support portion 44 of the housing central wall portion 42. Pintle 52 has an external cylindrical bearing in the internal cylindrical bearing of the spider 54 to rotatably support the spider. The spider has radial spherical pistons 56 cooperating with radial cylinders 57 which have a slipper base slidably mounted on the bearing ring 58. The bearing ring is rotatably supported on needle bearings 59 in the internal bearing surface of the bearing support 61 which is mounted at each side for reciprocable displacement varying movement on the bearing blocks 63 secured by screws 64 to the intermediate wall portion 42 and moved by a suitable piston and cylinder displacement control actuator or servo motor 65. This pump displacement varying means, by moving the support ring, variably moves the center of the pump bearing ring to either side of the center of the pump pintle and spider or pump axis to variably pump fluid in either direction for forward or reverse drive when the motor variable displacement means variably maintains the motor bearing ring on one side of the motor axis. This displacement varying means is described and shown in more detail in connection with the following description of the motor. The pump pintle 52 has a first pintle passage 66 and a second pintle passage 67 connected respectively to the first 68 and second 69 axial passage portion in the axial passage portion 51 of intermediate wall 42. These passages are a part of the power circuit passages connecting the pump to the motor to hydrostatically deliver power. One of these passages is a supply or high pressures passage and the other a return or low pressure passage depending on the direction of motor rotation, the position of the variable displacement control and whether the transmission is functioning to drive the output or the output is driving, as during overrun braking.

The pump shaft 33, which is driven by the splined connection with the hub 32 of damper 29, is connected by suitable fasteners, i.e., rivets 71 to drive the spider 54 and passes through a seal and aperture 72 in the pump cover plate 37.

The motor 76 is similarly constructed and has a pintle 77 having a flange similarly secured by screws 75 to the motor pintle support portion 49 of the intermediate wall 42. The motor spider 78 has a cylindrical internal bearing surface mounted on the cylindrical external bearing surface of the pintle for rotation thereon and radial spherical pistons 79 which reciprocate in the radical cylinders 81 which have a slipper base slidably mounted on the internal cylindrical bearing surface of bearing support 82. The bearing ring 82 is rotatably mounted by needle bearings 83 on the internal cylindrical bearing surface of the bearing support 84 which is reciprocably mounted on oppositely disposed bearing blocks 86 secured by screws 87 to the intermediate wall. The bearing support has opposite parallel bearing surfaces in bearing engagement with similar surfaces on the bearing blocks 86 providing the parallel planar bearings 88 on which the bearing support reciprocates. A servo motor (FIG. 1) 91, having a piston 92 reciprocably sealed in cylinder 93 cast integrally with the motor cylindrical wall and connected by a rod 94 to the bearing ring 82 adjustably reciprocates the bearing ring 61 to vary the displacement of the motor. The servo motor on the selective supply and exhaust of fluid to the opposed chambers thereof by a suitable control system including passages 95 moves the center of the bearing ring transversely relative to the motor axis. While in the pump variable displacement means, the center of the bearing ring is moved on both sides of the pump axis to reverse the direction of pumping for forward and reverse drive, in the motor the center of the bearing ring is only varied to one side as motor reversal is not necessary. As pointed out above, the pump displacement is similarly varied by the structurally identical servo motor 65.

The motor pintle 77 has a first passage 96 and a second passage 97 in an axial direction respectively to the first motor axial passage portion 98 and the second motor axial passage portion 99 in the axial passage portion 46 of intermediate wall 42.

Figure 1:
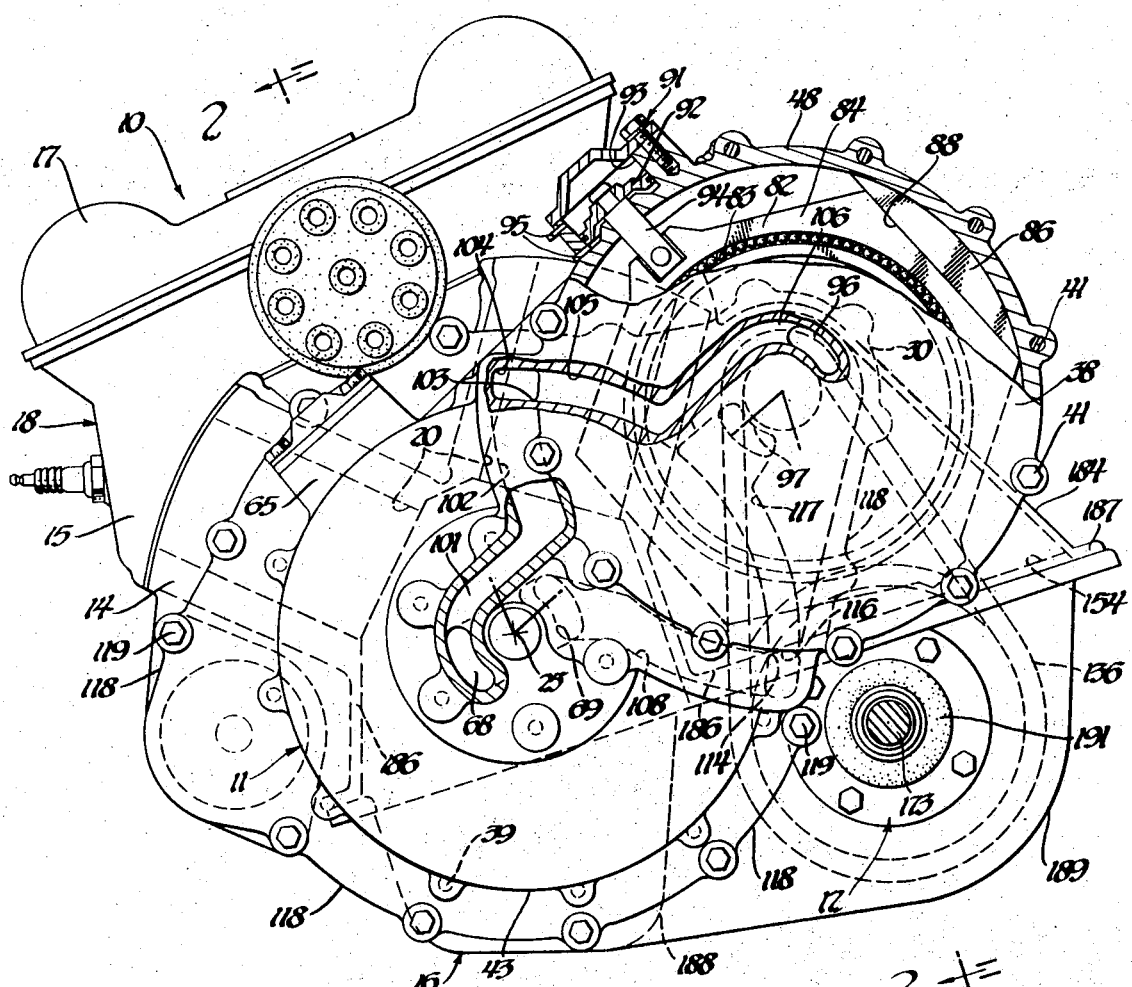
FIG. 1 is an elevation view of the power package with parts in section to show details.

The above first and second axial pump passage portions 68, 69 and first and second axial motor passage portions 96, 97 are respectively interconnected by curved connecting passages extending alongside the pump and motor cylindrical walls, as described below, all integrally cast with the intermediate wall. The first pump axial passage portion 68 has an offset portion 101 extending to a circular first connecting pump passage portion 102 as shown in FIG. 1 formed by the addition of a wall parallel to the motor cylindrical wall portion and a wall parallel to the intermediate wall portion which extends circularly a short distance along the perimeter of the motor cylindrical wall portion to the nape 103 between the pump and motor cylindrical wall portions. The first connecting pump passage portion is connected at nape 103 by a short first axial transfer passage portion, or opening, 104 merely extending across the thickness of the intermediate wall to the motor connecting passage portion 105 which extends peripherally around the pump cylindrical wall and has a portion parallel to it and a portion parallel to the intermediate wall portion. The passage 105 is connected by a motor offset passage 106 to the first motor axial passage portion 96.

Figure 2:
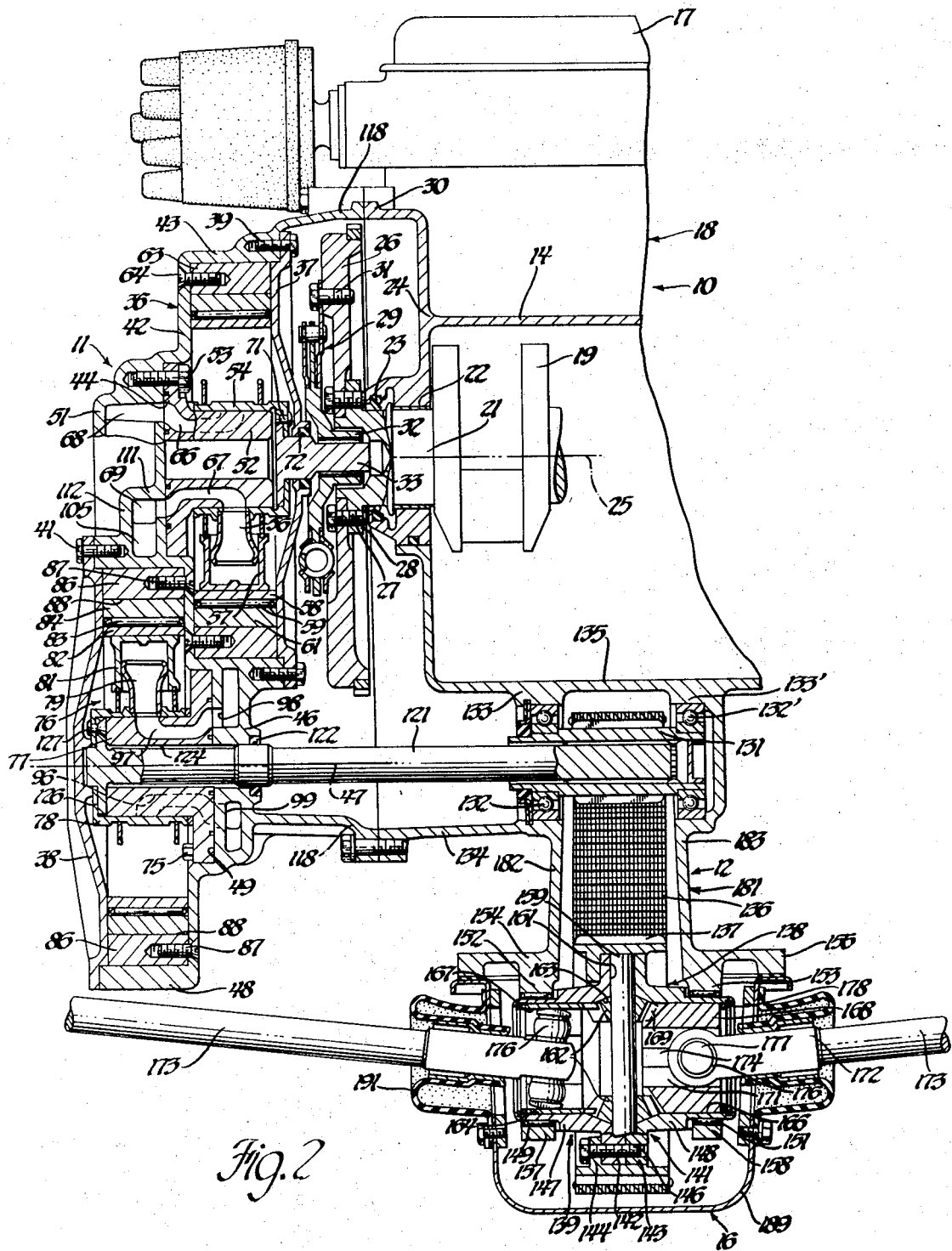
FIG. 2 is a section of FIG. 1 on the line 2—2.

The second pump axial passage 69 is directed directly to the second connecting passage portion 108 which extends oppositely to the first pump connecting passage portion 102 circumferentially around the motor cylindrical wall across the pump portion of the intermediate wall and has, as best shown in FIG. 2, a cylindrical portion 111 following the motor cylindrical wall portion and a flat portion 112 parallel to the intermediate wall portion curving with the motor cylindrical wall. At the opposite nape 114, between the pump and motor cylindrical wall portions, there is a transfer passage portion 116 extending across the intermediate wall to the second motor connecting passage portion 117 which extends around the pump cylindrical wall portion and across the intermediate wall and has, like these other passages, walls parallel to the pump cylindrical wall portion and the intermediate wall and connects to the second motor axial passage 97, as shown in FIG. 1.

The hydrostatic transmission 11 has an enclosing circular mounting flange 118 which, as best shown in FIG. 1, extends around over half of the pump cylindrical wall 43 and less than half of the smaller diameter motor central axial passage portion with intermediate connecting portions is secured to the similarly shaped flange 30 on the engine block 14 by bolts 119.

The motor or hydrostatic transmission output shaft 121 extends through a seal and aperture 122 in the axial passage portion 46 of the intermediate wall member and through an aperture 124 in pintle 77 and has a flange 126 secured by fasteners, i.e., rivets 127, to the motor spider 78. The shaft at its opposite end is splined to an output gear 131 rotatably mounted in spaced bearings 132, 132' supported in spaced webs 133, 133', the final drive housing portion 134 formed as an integral part of the block portion 14 of the engine housing 18. The final drive shaft housing portion 134 is formed integrally with the upper portion of side wall 135 of block 14 and its front portion provides the portion of flange 24a extending around the motor and projecting beyond block 14. The final drive shaft housing portion has a cross section shaped like flange 30 at its front end and an intermediate transverse web 133 and extends axially to the rear web or rear end wall 133'. The drive gear 131 is connected by chain 136 having internal gear teeth to the spur ring gear 137 mounted on the differential carrier 138. The differential carrier has opposed symmetrical portions 139, 141 having radial flanges 142, 143 at one end in facing contacting relation. The ring gear 137 has a radial mounting flange 144. Screws 146 extend through gear flange 144 and differential flanges 142, 143 to secure the gear to the differential carrier and the differential flanges and portions together. The differential carrier portions 139, 141 respectively have cylindrical sleeve portions 147, 148 having external bearing surfaces rotatably supported by bearings 149 and 151 supported respectively in the bearing supports consisting of a conventional semi-circular saddle 152, 153 formed integrally with the differential housing flange portions 154, 156 of the final drive housing 134 and a semi-circular cap member 157, 158 bolted to the saddle. The carrier 138 has transverse pinion shaft 159 clamped in radial bores 161 in carrier 138 formed by facing semi-circular recesses in the flanges 142, 143. The pinion shaft has bevel pinions 162 at each end rotatably mounted thereon and axially engaging bearing surfaces 163 on the internal surface of the sleeve portions 147, 148 of carrier 138. The carrier has in each opposite cylindrical sleeve portion an internal cylindrical bearing bore 164, 166 rotatably receiving and supporting the cylindrical gear and universal joint members 167, 168. Each member 167, 168 has on the end facing the bevel pinions, a bevel gear 169 meshing with both pinions and an internal bearing bore 171 to receive the ball end 172 of a swing axle 173. Each bore 171 has diametrically opposed axial grooves 174 receiving drive members 176 rotatably mounted on the cross pin member 177 fixed in the ball end 172 of the swing axle. This is a constant velocity universal joint with the drive members having a spherical bearing surface in bearing engagement with the flat sides of the recesses and the pin having a spherical end in bearing engagement with the flat base of the recess.

The universal joint slots 174 extend axially completely through the gear and universal joint members 167, 168 and partially interrupt the bevel gears 169 for ease of manufacture of this member. A thrust washer and snap ring assembly 178 fixed in each internal bore 164, 166 of carrier portions 139, 141 to hold each member 167, 168 with its gear 169 in proper mesh with pinions 162.

If three pinions 180, FIG. 3, like the pair of pinions 162, or another odd number of pinions are used in an equal peripherally spaced arrangement in a carrier 179 like carrier 138, no pinion is opposite another pinion so only one pinion can at any time engage a recess portion of an annular gear. This same effect can also be achieved by unequal peripheral pinion spacing of an odd or even number of pinions which also avoid having diametrically opposite pinions.

The final drive assembly 12 has the above described final drive shaft housing portion 134 and a differential portion 181 having web walls 182, 183 generally aligned with webs 133, 133' perpendicular to the side of the engine block 14 and located on opposite sides of the chain 136 and having an outer wall 184. The final drive shaft portion is interrupted between web walls 182, 183 to provide a free space for the chain between the blocks 14 and outer wall 184. The block 14 has a bottom flange 186 extending around the base of the block and at each bottom edge of web walls 182, 183 there are respectively flanges 154, 156 in the plane of the block base flange 186. The flanges 154, 156 are connected by axially extending flange 187 at the bottom end of outer wall 184. The oil pan 16 has a conventional engine portion 188 secured to engine block flange 186 and a side extension 189 providing a differential portion secured to flanges 154, 156, 187 to enclose the lower portion of the engine and differential housings. Each side of the differential housing pan portion 189 has an aperture for a swing shaft 173 and boot seal 191 between a swing shaft 173 and the differential pan.

The operation and advantages of this power drive assembly are believed apparent from the above detailed description. The engine block has rigidly combined therewith, preferably as a one piece casting, the hydrostatic support flange 30, the drive shaft housing 134 and differential housing 181 to mount the hydrostatic transmission with the pump on the engine axis, the motor on the drive shaft axis and both spaced from the differential drive axis for a simple compact swing axle power assembly. The hydrostatic transmission has a reduced offset between the pump and motor axes and a unitary rigid intermediate wall housing, preferably a one piece casting, providing the pump and motor chambers and support for the pump and motor operating mechanism and connecting power circuit passages. The engine and pump axis, the motor and drive shaft axis and differential axes are located at the apexes of a triangle and close together for this compact arrangement.

The above described preferred embodiments are illustrative of the invention.

It is claimed:

1. In a hydrostatic transmission; a hydrostatic transmission housing having an intermediate wall with a pump chamber and motor passages on one side and pump passages coaxial with said pump chamber and a motor chamber coaxial with said motor passages, both on the opposite side of said wall; pump means mounted in said pump chamber having a coaxial pump shaft; motor means mounted in said motor chamber having a rotatably mounted coaxial driven shaft driven by said motor means in spaced parallel relation to said pump shaft; said pump chamber and said motor chamber being in partial overlapping relation with napes at the points where their perimeters intersect to reduce the space between said pump shaft and driven shaft; connecting passage means extending from said pump passages along said opposite side of said wall, across said wall at the napes between said pump and motor chambers and along said one side of said wall to said motor passages.

2. In a hydrostatic transmission; a main housing having a pump portion and a motor portion having a common intermediate wall portion, said pump portion having, on one side of said intermediate wall portion, a central pump axial passage portion and, on the other side of said intermediate wall portion, a central pump pintle support portion and a larger diameter peripheral pump cylindrical portion all arranged concentrically about a pump axis; said motor portion having, on the other side of said intermediate wall portion, a central motor axial passage portion and on the one side of said intermediate wall portion, a central motor pintle support portion and a peripheral pump cylindrical portion all arranged concentrically about a motor axis parallel to said pump axis; said pump and said motor cylindrical portions overlapping so a portion of said intermediate wall portion is common to said pump and said motor portions; said pump cylindrical portion and said motor axial passage portion having a common wall portion; said motor cylindrical portion and said pump axial passage portion having a common wall portion; said pump and said motor axial passage portions each having first and second axial passages; first and second connecting passages respectively having first and second pump portions connected respectively to said first and said second pump axial passages, extending oppositely and having common walls with said intermediate wall portion and said motor cylindrical wall portion and first and second motor portions respectively connected to said first and said second motor axial passages, extending oppositely and having common walls with said intermediate wall portion and said pump cylindrical wall portion and being connected across said intermediate wall portion at the opposite napes between said cylindrical wall portions; a pump and a motor pintle fixedly mounted respectively on said pump and said motor pintle support portions; pump means rotatably mounted on said pump pintle support and said pump cylindrical wall portion; motor means rotatably mounted on said motor pintle support and said motor cylindrical wall portion.

3. In a hydrostatic transmission; a main housing having a pump portion and a motor portion having a common intermediate wall portion, said pump portion having, one one side of said intermediate wall portion, a central pump axial passage portion and, on the other side of said intermediate wall portion, a central pump pintle support portion and a larger diameter peripheral pump cylindrical portion all arranged concentrically about a pump axis; said motor portion having, on the other side of said intermediate wall portion, a central motor axial passage portion and on the one side of said intermediate wall portion, a central motor pintle support portion and a peripheral pump cylindrical portion all arranged concentrically about a motor axis parallel to said pump axis; said pump and said motor cylindrical portions overlapping so a portion of said intermediate wall portion is common to said pump and said motor portions; said pump cylindrical portion and said motor axial passage portion having a common wall portion; said motor cylindrical portion and said pump axial passage portion having a common wall portion; said pump and said motor axial passage portions each having first and second axial passages; first and second connecting passages respectively having first and second pump portions connected respectively to said first and said second pump axial passages, extending oppositely and having common walls with said intermediate wall portion and said motor cylindrical wall portion and first and second motor portions respectively connected to said first and said second motor axial passages, extending oppositely and having common walls with said intermediate wall portion and said pump cylindrical wall portion and being connected across said intermediate wall portion at the opposite napes between said cylindrical wall portions; a pump and a motor pintle fixedly mounted respectively on said pump and said motor pintle support portions; pump means rotatably mounted on said pump pintle support and said pump cylindrical wall portion; motor means rotatably mounted on said motor pintle support and said motor cylindrical wall portion; a pump cover attached to said pump cylindrical portion; a pump shaft connected to said pump means extending through said pump cover; a motor cover attached to said motor cylindrical portion and a motor shaft connected to said motor means extending through said motor pintle, motor pintle support portion of said intermediate wall portion and motor axial passage portion.

* * * * *